Dec. 17, 1935.  L. GRIFFITHS  2,024,161

MAGNETO GENERATOR

Filed July 13, 1934

Inventor:
Leonard Griffiths,
by Harry E. Dunham
His Attorney.

Patented Dec. 17, 1935

2,024,161

UNITED STATES PATENT OFFICE 2,024,161

MAGNETO GENERATOR

Leonard Griffiths, Coventry, England, assignor to General Electric Company, a corporation of New York Application July 13, 1934, Serial No. 734,927
In Great Britain July 21, 1933

5 Claims. (Cl. 171—252)

This invention relates to improvements in dynamo-electric machines or magneto generators and particularly to the type of generator having a rotating magnet system.

The object of the invention is to provide a compact rotatable magnet system, having in particular a short axial length to effect a reduction in the overall length and size of the magneto.

According to the invention, I provide a tubular magnet the central bore of which increases from the middle to its ends, giving increased magnetic length over the axial length of the rotatable member, thereby providing an elongated rotatable magnetic member. Each of the extremities of the magnet makes intimate contact with a separate north or south pole-piece member, preferably of malleable cast iron. The pole-piece members are secured to a central spindle of non-magnetic material, such as non-magnetic steel, preferably by rivets passing through projecting bosses on the pole-piece members, the spindle passing through the bore of the magnet. The pole-piece members are so shaped that polar projections of each member will cooperate in rotation with the usual polar projections of the fixed armature of the magneto to produce the required reversals of flux through the armature core.

Figure 1:
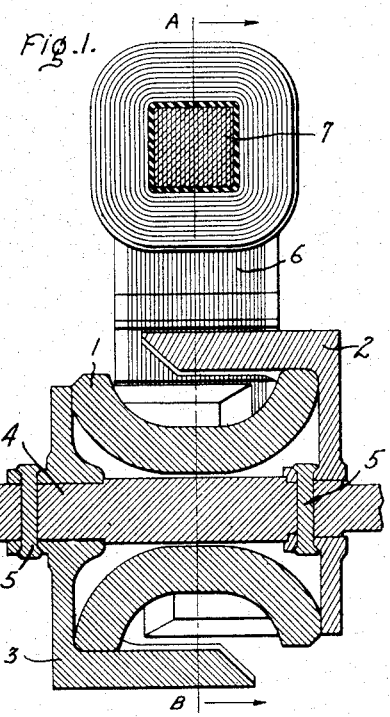
Figure 2:
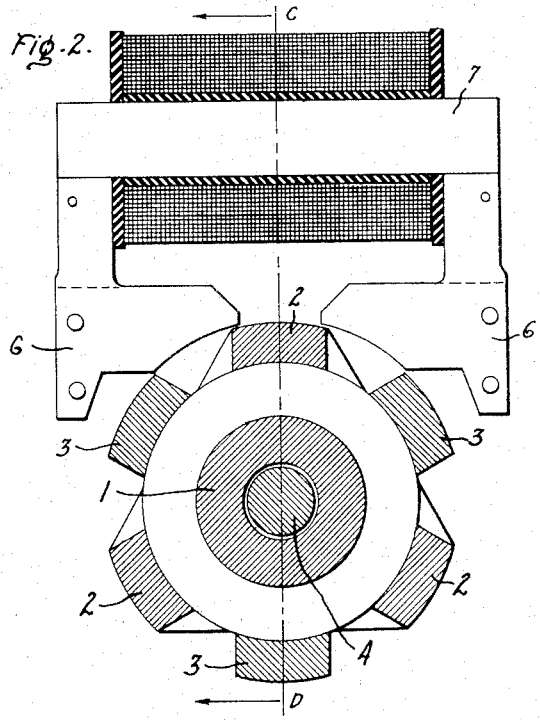

A form of rotatable member construction according to the invention is illustrated in the accompanying drawing, Fig. 1 being a sectional view on the line C D of Fig. 2 and Fig. 2 being a sectional view on the line A B of Fig. 1.

In the drawing, 1 represents the permanent magnet of tubular or reel shape with a bore increasing in size from the middle to its ends, the extremities of which magnet are in good magnetic contact with the pole-piece members 2 and 3 respectively. The pole-piece members are secured to a non-magnetic spindle 4 as by rivets 5 and have inwardly turned polar projections arranged circumferentially parallel to the spindle and so spaced that polar projections from both the members 2 and 3 in rotating simultaneously cooperate with the poles 6 of the conventionally shown stationary member or fixed armature to produce the required flux reversals through the core 7 of the armature.

The drawing illustrates a magneto or dynamo-electric machine rotatable member suitable for an internal combustion engine of six cylinders, but it will be understood that by modifying the number of corresponding polar projections the number of reversals of flux in the armature core per revolution of the rotatable member can be correspondingly modified.

What I claim as new and desire to secure by Letters Patent of the United States, is:

1. A rotating magnet system for a magneto generator comprising a spindle, a tubular magnet flared outwardly from the center toward each end thereof and mounted on said spindle, a pair of pole-piece members secured to said spindle and arranged to provide an elongated magnetic path, each of said pole-piece members being in intimate contact with one end respectively of said magnet, and polar projections extending alternately from each of the said pole-piece members.

2. A rotating magnet system for a magneto generator comprising a spindle of non-magnetic material, a tubular magnet increasing in diameter from the center toward each end thereof and mounted on said spindle and arranged to provide an elongated magnetic path, a pair of pole-piece members secured to the spindle each being in good magnetic contact with one end respectively of said magnet, and means including arms extending from alternate pole-piece members radially and inwardly over said magnet parallel to its axis for providing circumferentially spaced poles of alternate polarity.

3. A rotating magnet system for a magneto generator comprising a spindle, a tubular magnet mounted on said spindle having a bore of a diameter increasing from its middle to each end and arranged to provide an elongated magnetic path, a pole-piece member in intimate contact with each end of said magnet, and radial polar extensions from each of said pole-piece members extending radially and inwardly over the magnet towards its opposite end.

4. A dynamo-electric machine including a stationary member, a winding on said stationary member, means including a rotatable tubular member of magnetic material flared outwardly from the center toward each end thereof for providing an elongated magnetic path in said rotatable member, and a pole-piece for said rotatable member cooperating with said stationary member.

5. A dynamo-electric machine including a stationary member having a core provided with pole-pieces, a winding on said core, a non-magnetic rotatable shaft, means including a tubular permanent magnet mounted on said shaft and increasing in diameter from the center towards each end thereof for providing a rotatable member having a magnetic length greater than the axial length of said rotatable member, and axially extending pole-pieces carried by said rotatable member.

LEONARD GRIFFITHS.

CERTIFICATE OF CORRECTION.

Patent No. 2,024,161.                                           December 17, 1935.

LEONARD GRIFFITHS.

It is hereby certified that error appears in the printed specification of the above numbered patent requiring correction as follows: Page 1, second column, line 7-8, claim 1, strike out the words "and arranged to provide an elongated magnetic path" and insert the same after "spindle" and before the comma in line 6; and that the said Letters Patent should be read with this correction therein that the same may conform to the record of the case in the Patent Office.

Signed and sealed this 18th day of February, A. D. 1936.

Leslie Frazer

Seal)                                           Acting Commissioner of Patents.